United States Patent Office 3,097,139
Patented July 9, 1963

3,097,139
HYPOCHOLESTEROLAEMIA COMPOSITIONS
Jeffrey Meyrick Thorp, Macclesfield, England, assignor to Imperial Chemical Industries Limited, London, England, a corporation of Great Britain
No Drawing. Filed Mar. 2, 1961, Ser. No. 92,768
Claims priority, application Great Britain Mar. 10, 1960
14 Claims. (Cl. 167—65)

This invention relates to pharmaceutical compositions and more particularly it relates to pharmaceutical compositions which possess valuable hypocholesterolaemic activity.

It is believed that diseases such as coronary artery disease and atherosclerosis in man are associated with an abnormally high concentration of cholesterol in the blood stream.

In our United Kingdom specification No. 860,303 there are described and claimed pharmaceutical compositions containing as active ingredient at least one compound of the formula:

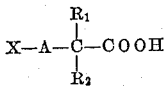

wherein A stands for oxygen or for the imino radical, $R_1$ and $R_2$, which may be the same or different, stand for hydrogen or for alkyl radicals, or they may be joined to form, together with the adjacent carbon atom, a cycloalkyl ring, and X stands for a phenyl or naphthyl radical which may optionally be substituted by one, two or three substituents, which may be the same or different and which are selected from halogen atoms and alkyl, alkenyl, alkoxy, aryl, aralkyl, aralkoxy and arylamino radicals, or the esters or salts thereof, together with a pharmaceutically-acceptable inert diluent or carrier, provided that the inert diluent or carrier is not water or an organic solvent.

It is stated in this specification that the said compounds reduce the concentration of cholesterol in the blood serum, and they may therefore be useful in the treatment of such diseases as coronary artery disease and atherosclerosis.

In said specification there are also described and claimed compositions as defined above wherein there is present a dietary supplement for example vitamins, salts of glycerophosphoric acid, choline and inositol, amino acids or hormones or hormone extracts. However, no composition containing a hormone or hormone extract is disclosed in said specification.

We have now made the surprising discovery that a mixture of ethyl α-(4-chlorophenoxy)isobutyrate and androsterone reduces the concentration of cholesterol in the blood by an amount greater than is caused by the administration of ethyl α-(4-chlorophenoxy)isobutyrate alone. Oral administration of androsterone alone has no effect upon the concentration of cholesterol in the blood and consequently, unexpectedly, the effect produced by the mixture of ethyl α-(4-chlorophenoxy)isobutyrate and androsterone is greater than would have been predicted from the known effects of these two substances separately. We have found also that oral administration of other androstane derivatives, as defined below, in admixture with carboxylic acids, as defined below, have a much greater effect upon the concentration of cholesterol in the blood than that which would have been expected or predicted from the known properties of the constituents of the mixture when used separately.

Therefore, according to the invention we provide pharmaceutical compositions which consist of or comprise at least one carboxylic acid derivative of the formula:

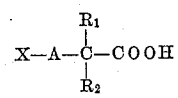

wherein A stands for oxygen or for the imino radical, wherein $R_1$ stands for hydrogen or for an alkyl radical, $R_2$ stands for an alkyl radical, or $R_1$ and $R_2$ may be joined to form, together with the adjacent carbon atom, a cycloalkyl ring, and wherein X stands for a phenyl or for an α-naphthyl radical which may optionally be substituted, or an ester or a salt thereof, together with at least one androstane derivative of the formula:

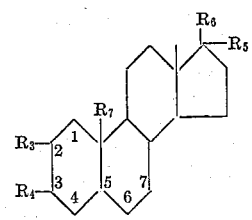

wherein $R_3$ stands for hydrogen or for the hydroxymethylene radical, $R_4$ stands for the hydroxy radical or for a doubly bound oxygen atom, $R_5$ stands for the hydroxy radical and $R_6$ and $R_7$ are the same or different and stand for hydrogen or for methyl radicals, or $R_5$ and $R_6$ together stand for a doubly bound oxygen atom, and wherein the bond joining the carbon atoms in the 4- and 5-positions is optionally a double bond, or a lower fatty acid ester thereof, in admixture, where necessary, with a non-toxic pharmaceutically-acceptable diluent or carrier therefor.

As suitable values for $R_1$ and $R_2$ there may be mentioned, for example, alkyl radicals containing up to 4 carbon atoms, for example the methyl or ethyl radical. As a suitable value when $R_1$ and $R_2$ are combined, together with the adjacent carbon atom, there may be mentioned, for example, the cyclohexane ring.

Suitable optional substituents in the phenyl or naphthyl radical may be, for example, halogen, for example chlorine or bromine, or alkyl, for example alkyl containing up to 8 carbon atoms, or alkenyl, alkoxy, or aryl, for example the phenyl radical, or aralkyl, for example the benzyl radical, or aralkoxy, for example the benzyloxy radical, or arylamino, for example the anilino radical.

Suitable esters of said carboxylic acids may be, for example, esters with aliphatic alcohols, for example aliphatic alcohols containing up to 4 carbon atoms; and preferred esters are the methyl, ethyl and n-propyl esters. Suitable salts of said carboxylic acids may be, for example, alkali metal salts, for example the sodium or potassium salts, or alkaline earth metal salts, for example the calcium salts, or, when there is present a strongly basic group, the acid-addition salts thereof, for example the hydrochlorides.

The preferred carboxylic acid derivatives are α-(4-chlorophenoxy)isobutyric acid and α-(4-ethylphenoxy)-isobutyric acid, the alkali metal and alkaline earth metal salts thereof, for example the sodium, potassium or calcium salts, and the lower alkyl esters thereof, for example the ethyl or n-propyl esters thereof.

Other examples of said carboxylic acid derivatives are α-phenoxyisobutyric acid; α-(2-methylphenoxy)isobutyric acid; α-(3-methylphenoxy)isobutyric acid; α-(4-methylphenoxy)isobutyric acid; α-(2-chlorophenoxy)isobutyric acid; α-(3-chlorophenoxy)isobutyric acid; α-(4-bromophenoxy)isobutyric acid; α-(2,4-dichlorophenoxy)isobutyric acid; α-(2,4,5-trichlorophenoxy)isobutyric acid; α-(3,4-dimethylphenoxy)isobutyric acid; α-(4-methoxyphenoxy)isobutyric acid; α-(α-naphthoxy)isobutyric acid; α-(4-chlorophenoxy)-α-methyl-n-butyric acid; α-(4-chlorophenoxy)propionic acid; α-(4-chloroanilino)isobutyric acid; 1-anilinocyclohexane carboxylic acid; α-(4-ethylphenoxy)isobutyric acid, M.P. 77–78° C.; α-(4-t-butylphenoxy)isobutyric acid, M.P. 93–94° C.; α-(4-phenylphenoxy)isobutyric acid, M.P. 167–168° C.; α-(4-t-octylphenoxy)isobutyric acid, M.P. 89–90° C.; α-(2-methoxyphenoxy)isobutyric acid, M.P. 45–47° C.; α-(3-methyl-4-chlorophenoxy)isobutyric acid, M.P. 85–86° C.; ethyl α-(2-methoxy-4-allylphenoxy)isobutyrate, B.P. 118–120° C./0.2 mm.; ethyl α-(2-benzylphenoxy)isobutyrate, B.P. 152–156° C./0.4 mm.; ethyl α-(3,4-dichlorophenoxy)isobutyrate, B.P. 104° C./0.2 mm.; ethyl α-(2-methoxy-4-propenylphenoxy)isobutyrate, B.P. 128–132° C./0.3 mm.; ethyl α-[4-(α,α-dimethyl-n-butyl)phenoxy]isobutyrate, B.P. 127° C./0.7 mm.; ethyl α-(4-benzylphenoxy)isobutyrate, B.P. 149–152° C./0.5 mm.; ethyl α-(2-phenylphenoxy)isobutyrate, B.P. 126° C./0.2 mm.; ethyl α-(4-anilinophenoxy)isobutyrate, B.P. 185–190° C./0.5 mm.; ethyl α-(4-benzyloxyphenoxy)isobutyrate, B.P. 180–190° C./0.6 mm.; α-(4-benzyloxyphenoxy)isobutyric acid, M.P. 134–135° C.; 1-(4-chloroanilino)cyclohexane carboxylic acid, M.P. 159° C.; α-(2-chloroanilino)isobutyric acid, M.P. 87–88° C.; n-butyl α-(4-chlorophenoxy)isobutyrate, B.P. 178–182° C./15 mm.; n-propyl α-(4-chlorophenoxy)isobutyrate, B.P. 167–169° C./15 mm.; methyl α-(4-chlorophenoxy)isobutyrate, B.P. 148–150° C./20 mm.; and α-(4-chloroanilino)isobutyric acid, M.P. 142–143° C., and the salts and esters thereof.

Some of said carboxylic acid derivatives are new compounds, but all said carboxylic acid derivatives may be manufactured by processes known to the art. Thus said carboxylic acid derivatives wherein A stands for oxygen may be manufactured by the interaction of an alkali metal derivative of a hydroxy compound of the formula X—OH, wherein X has the meaning stated above, with a compound of the formula:

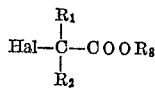

wherein $R_1$ and $R_2$ have the meanings stated above, wherein Hal stands for halogen, for example bromine, and $R_8$ stands for an alkyl radical.

Said carboxylic acid derivatives wherein A stands for oxygen, and wherein $R_1$ and $R_2$ stand for alkyl radicals, or $R_1$ and $R_2$ may be joined to form, together with the adjacent carbon atom, a cycloalkyl radical may be manufactured by the interaction of a hydroxy compound of the formula X—OH, wherein X has the meaning stated above, with a ketone of the formula $R_1.CO.R_2$, wherein $R_1$ and $R_2$ stand for alkyl radicals or $R_1$ and $R_2$ may be joined to form, together with the adjacent keto radical, a cycloalkanone, in the presence of a tri- or tetra-halogenated methane derivative, for example chloroform, and a strong base, for example an alkali metal hydroxide in solid form.

Said carboxylic acid derivatives wherein A stands for the imino radical may be manufactured by the acidic hydrolysis of a compound of the formula:

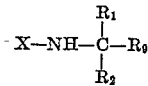

wherein X, $R_1$ and $R_2$ have the meanings stated above, and wherein $R_9$ stands for the carboxyamide radical (—$CONH_2$) or the cyano radical.

Said carboxylic acid derivatives which contain a free carboxy radical may be converted to the corresponding esters or salts by conventional methods.

Suitable androstane derivatives of the formula stated above which may be used as the active ingredient in the compositions of the invention may be 17α-hydroxyandrost-4-en-3-one, 17β-hydroxyandrostan-3-one, testosterone, androstan-3α,17β-diol, 17β-hydroxy-19-norandrost-4-en-3-one, 17β-hydroxy-2-hydroxymethylene-17α-methylandrostan-3-one, androsterone and its acetate and propionate, androst-4-en-3,17-dione, 3β-hydroxyandrostan-17-one and 17β-hydroxy-17α-methyl-androst-4-en-3-one (methyltestosterone).

The preferred androstane derivatives are androsterone, androsterone acetate and androsterone propionate.

The compositions of the invention may optionally contain an oestrogen as an additional ingredient and suitable oestrogens are oestradiol, ethynyloestradiol, hexoestrol and stilboestrol. The said oestrogen is generally present to such an extent that the daily dose of oestrogen administered is within the range of from 0.1 mg. to 5.0 mg. The known oestradiol is usually given at the rate of between 0.2 mg. and 0.5 mg. per day and the known stilboestrol and hexoestrol are usually each given at the rate of between 0.1 mg. and 5 mg. per day.

The pharmaceutical compositions may be formulated so as to be suitable for oral administration. Thus they may be formulated according to the known art as tablets, capsules, emulsions, suspensions, solutions or dispersible powders.

The tablet compositions of the invention may be coated or uncoated and they may be effervescent or non-effervescent. Conventional excipients for tablet formulations may be used, for example inert diluents, for example, magnesium carbonate or lactose, distintegrating agents, for example maize starch or alginic acid, and lubricating agents, for example magnesium stearate. The ratio of the proportions of the carboxylic acid derivative, for example calcium α-(4-chlorophenoxy)isobutyrate, to the androstane derivative, for example androsterone, in said tablet composition may vary, for example, from 100:1 to 5:1 respectively and preferably from 40:1 to 20:1 respectively. When an oestrogen is additionally present in the tablet composition, the ratio of the proportion of androstane derivative to the oestrogen in the said tablet composition may vary, for example, from 500:1 to 10:1 respectively, such that the daily dose of oestrogen administered is within the range of from 0.1 mg. to 5.0 mg.

Liquid or solid formulations may be filled into capsules for oral administration. Preferred capsule compositions of the invention contain a solution of the androstane derivative in an ester of said carboxylic acid which is liquid at ambient temperature, for example the ethyl or n-propyl ester, for example ethyl α-(4-chlorophenoxy)isobutyrate or ethyl α-(4-ethylphenoxy)isobutyrate. The ratio of the proportions of androstane derivative to said liquid ester may vary, for example, from 1:5 to 1:100 respectively, preferably from 1:20 to 1:40 respectively. Alternatively the capsule compositions may contain a solution of the active ingredients in a pharmaceutically-acceptable oil for example a vegetable or animal oil, for example sunflower seed oil, maize oil or cod-liver oil, or for example, dimethylacetamide and such solutions may contain conventional excipients, for example anti-oxidants, for example wheat germ oil. Solid formulations suitable for filling into capsules may contain solid active ingredients, for example α-(4-chlorophenoxy)isobutyric acid and androsterone, in admixture with solid excipients known to have a buffering action, for example colloidal, aluminium hydroxide or calcium hydrogen phosphate. When an oestrogen is additionally present in the above compositions, the ratio of the proportion of androstane derivative to the oestrogen in the said compositions may vary, for example, from 500:1 to 10:1 respectively, such that the daily dose of oestrogen administered is within the range of 0.1 mg. to 5 mg.

Emulsion compositions may be formulated using an ester of said carboxylic acid which is liquid at ambient temperature as the non-aqueous phase, or a solution of the active ingredients in an orally-acceptable oil, for example maize oil or cod-liver oil, may constitute the non-aqueous phase. The solvent oil used may itself be of known utility in the treatment of atherosclerosis, for example sunflower seed oil. The emulsion compositions may contain conventional excipients, for example emulsifying agents, for example sorbitan tri-oleate, polyoxyethylene sorbitan mono-oleate, lecithin, gum acacia or gum tragacanth, preservatives, anti-oxidants, flavouring agents, sweetening agents and colouring materials.

Active ingredients which are insoluble or sparingly soluble in water, for example androsterone and α-(4-chlorophenoxy)isobutyric acid or the calcium salt thereof, may be formulated as suspensions, either in an aqueous base or in an emulsion base. Aqueous based suspensions are prepared with the aid of wetting agents, for example poly-ethylene oxide condensation products of either alkylphenols, fatty alcohols or fatty acids, and suspending agents, for example a hydrophilic colloid, for example polyvinylpyrrolidone. Emulsion-based suspensions are prepared with the aid of emulsifying agents such as those described above. The suspension compositions of the invention may contain in addition such conventional excipients as sweetening agents, flavouring agents, colouring materials, preservatives and anti-oxidants.

The compositions of the invention may be in the form of a nutritive preparation in which the mixture of active ingredients is mixed with proteins, for example casein, and carbohydrates. The compositions of the invention may contain, in addition to the active ingredients, dietary supplements, for example vitamins, salts of glycerophosphoric acid, choline and inositol, the combination of which is known to be effective in reducing serum cholesterol levels, and amino-acids, for example methionine.

As indicated above, the compositions of the present invention are useful in the treatment of coronary artery disease and atheroscelerosis. It is expected that the compositions will generally be administered orally as capsules containing between 0.1 g. and 1 g. of the mixture of active ingredients, or as tablets containing between 0.1 g. and 3 g. of the mixture of active ingredients. These compositions will generally be administered at such a rate that the patient receives a daily dosage of between 1 g. and 10 g. of the mixture of active ingredients.

A preferred composition is one intended for oral use wherein about 3 parts by weight of androsterone or its acetate or propionate are dissolved in about 100 parts by weight of ethyl p-chlorophenoxyisobutyrate. The solution so obtained is dispersed into soft gelatine capsules so that each contains 250 mg. of this mixture. It is expected that administration of this composition will be such that the daily rate of administration will be 1–2 gm. of ethyl p-chlorophenylisobutyrate and 30–60 mgm. of androsterone.

The invention is illustrated but not limited by the following examples in which the parts are by weight:

*Example 1*

200 parts of ethyl α-(4-chlorophenoxy)isobutyrate and 6 parts of androsterone are mixed together and filled into gelatin capsules which are then suitable for oral administration for therapeutic purposes.

The above process is repeated using 0.04 part of oestradiol or 0.2 part of stilboestrol or hexoestrol in addition to the 200 parts of ethyl α-(4-chlorophenoxy)isbutyrate and 6 parts of androsterone. There are thus obtained capsules which are suitable for oral administration for therapeutic purposes.

*Example 2*

A mixture of 500 parts of calcium α-(4-chlorophenoxy)isobutyrate, 25 parts of androsterone, 94 parts of maize starch, 45 parts of alginic acid and 3.5 parts of magnesium stearate is compressed into slugs which are then broken into granules. The granules are sifted through an 8-mesh screen and 3.5 parts of magnesium stearate are then added. The mixture is compressed into tablets which are suitable for oral administration for therapeutic purposes.

*Example 3*

A solution of 200 parts of cane sugar, 1 part of sodium benzoate, 0.6 part of pyridoxine hydrochloride and 10 parts of a polyoxyethylene sorbitan mono-oleate condensate in 400 parts of water is added slowly to a stirred mixture of 500 parts of ethyl p-chlorophenoxyisobutyrate, 5 parts of 17α-hydroxyandrost-4-en-3-one, 25 parts of refined soya bean lecithin, 2.4 parts of a mixed tocopherols concentrate and 0.05 part of propyl gallate. The resultant emulsion is homogenised by passage through a conventional homogeniser and there is thus obtained an emulsion suitable for oral administration for therapeutic purposes.

*Example 4*

To a stirred solution of 200 parts of ethyl p-chlorophenoxyisobutyrate, 20 parts of 17β-hydroxyandrostan-3-one(testosterone), 5 parts of a mixed tocopherol concentrate, 0.1 part of propyl gallate, 50 parts of a polyoxyethylene sorbitan mono-oleate condensate, and 50 parts of sorbitan tri-oleate in 500 parts of maize oil is added a solution of 54 parts of sodium cyclamate, 1 part of pyridoxine hydrochloride, 3 parts of methyl p-hydroxybenzoate and 1 part of propyl p-hydroxybenzoate in 960 parts of water. A suitable flavouring agent is incorporated in the mixture which is then homogenised by passage through a conventional homogeniser. There is thus obtained an emulsion suitable for oral administration for therapeutic purposes.

*Example 5*

To a mixture of 40 parts of p-chlorophenoxyisobutyric acid, 3 parts of androstan-3α,17β-diol and 33.7 parts of liquid paraffin are added 3 parts of gum acacia and 1.5 parts of gum tragacanth. To the thoroughly triturated mixture is added slowly with stirring a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of edible dyestuff in 110 parts of water. After the incorporation of a suitable flavouring agent, the mixture is homogenised by passage through a conventional homogeniser and there is thus obtained an emulsion suitable for oral administration for therapeutic purposes.

*Example 6*

In a similar manner to that described in Example 5 but replacing the 33.7 parts of liquid paraffin by 30 parts of maize oil containing 0.01 part of propyl gallate, there is obtained an emulsion suitable for oral administration for therapeutic purposes.

*Example 7*

100 parts of calcium p-chlorophenoxyisobutyrate and 5 parts of 17β-hydroxy-19-norandrost-4-en-3-one are added to a solution of 15 parts of calcium cyclamate, 2 parts of a condensation product of octylcresol with 8–10 molecular proportions of ethylene oxide, 3 parts of polyvinyl pyrrolidone and 0.9 part of methyl p-hydroxybenzoate in 500 parts of water. The mixture is ball-milled for several hours and after the incorporation of a suitable flavouring agent there is obtained a suspension suitable for oral administration for therapeutic purposes.

*Example 8*

A mixture of 40 parts of p-chlorophenoxyisobutyric acid, 4 parts of 17β-hydroxy-2-hydroxymethylene-17α-methylandrostan-3-one, 40 parts of sucrose, 0.5 part of a cetyl alcohol polyethylene oxide condensate, 1 part of polyvinyl pyrrolidone, 0.25 part of methyl p-hydroxybenzoate and 100 parts of water is ball-milled for several hours. After the incorporation of suitable colouring and flavouring agents there is obtained a suspension suitable for oral administration for therapeutic purposes.

Example 9

200 parts of potassium p-chlorophenoxyisobutyrate and 40 parts of androsterone acetate are dissolved in a mixture of 83 parts of water, 250 parts of glycerol and 125 parts of ethyl alcohol. To the resultant solution is added a solution of 300 parts of sucrose in 150 parts of water. By the incorporation of a suitable flavouring agent and colouring matter, there is obtained a syrup suitable for oral administration for therapeutic purposes.

Example 10

200 parts of ethyl p-chlorophenoxyisobutyrate, 40 parts of androsterone propionate and 5 parts of wheat germ oil are dissolved in 750 parts of sunflower seed oil. The solution is filled into gelatin capsules which are then suitable for oral administration for therapeutic purposes.

The wheat germ oil and the sunflower seed oil may be replaced by an equal amount (755 parts) of dimethylacetamide and there are likewise obtained capsules which are suitable for oral administration for therapeutic purposes.

Example 11

25 parts of sodium glycerophosphate, 25 parts of calcium glycerophosphate, 50 parts of calcium p-chlorophenoxyisobutyrate and 7.5 parts of androst-4-en-3,17-dione are intimately mixed. The mixture is added gradually to 900 parts of soluble casein in a conventional mixer and mixing continued until homogeneous. There is thus obtained a dietary supplement suitable for oral administration for therapeutic purposes.

Example 12

An intimate mixture is prepared with conventional mixing equipment of 3 parts of pyridoxine hydrochloride, 100 parts of nicotinic acid, 100 parts of nicotinamide, 5 parts of methionine, 15 parts of choline bitartrate, 150 parts of ascorbic acid, 5 parts of calcium pantothenate, 10 parts of riboflavin, 1000 parts of calcium p-chlorophenoxyisobutyrate and 100 parts of 3-$\beta$-hydroxyandrostan-17-one. The mixture is filled into capsules which are then suitable for oral administration for therapeutic purposes.

Example 13

A mixture of 1 part of sodium di-octyl sulphosuccinate dissolved in a sufficient quantity of methanol, 500 parts of calcium p-chlorophenoxyisobutyrate, 62.5 parts of androsterone, 75 parts of maize starch and 5 parts of alginic acid is granulated by admixture with a sufficient quantity of aqueous 10% maize starch paste. The granules are passed through a 12-mesh screen and dried at 50–55° C. The granules are then again passed through a 12-mesh screen and 6 parts of magnesium stearate are added and the mixture is compressed. There are thus obtained tablets suitable for oral administration for therapeutic purposes.

Example 14

A mixture of 500 parts of potassium p-chlorophenoxyisobutyrate, 12.5 parts of 17$\alpha$-hydroxy-androst-4-en-3-one, 50 parts of light magnesium carbonate and 10 parts of magnesium stearate is compressed into slugs. The slugs are broken into granules which are passed through an 8-mesh screen and compressed. There are thus obtained tablets suitable for oral administration for therapeutic purposes.

Example 15

A mixture of 500 parts of potassium p-chlorophenoxyisobutyrate, 37.5 parts of 17$\beta$-hydroxyandrostan-3-one (testosterone) and 50 parts of light magnesium carbonate is granulated by admixture with a solution of 2 parts of sodium di-octyl sulphosuccinate in a sufficient quantity of methanol. The granules are passed through a 12-mesh screen and dried at 50–55° C. The granules are then again passed through a 12-mesh screen and 8 parts of magnesium stearate are added and the mixture is compressed. There are thus obtained tablets suitable for oral administration for therapeutic purposes.

Example 16

A mixture of 500 parts of p-chlorophenoxyisobutyric acid, 50 parts of androstan-3$\alpha$,17$\beta$-diol, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol; 3 parts of magnesium stearate are then added to the granules after which they are compressed to give tablets suitable for oral use for therapeutic purposes.

It is to be understood that the solid or liquid carboxylic acid derivatives used as the active ingredient in the foregoing Examples 1–16 may be replaced by any of the solid or liquid carboxylic acid derivatives listed in the descriptive part of the specification. Likewise any of the androstane derivatives used as active ingredients in the foregoing Examples 1–16 may be replaced by any of the androstane derivatives listed in the descriptive part of the specification. Furthermore, any of the Examples 3–16 may in addition contain an oestrogen, for example oestradiol, ethynyl-oestradiol, hexoestrol or stilboestrol, in the proportion as given in Examples 1 and 2 so that oral administration of the compositions for therapeutic purposes provides a daily dose of oestrogen within the range of 0.1–5.0 mg.

What I claim is:

1. A pharmaceutical composition comprising a pharmaceutically effective amount of a mixture of at least one compound selected from the group consisting of carboxylic acid derivatives of the formulae:

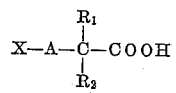

and

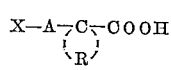

wherein A is selected from the group consisting of oxygen and imino; $R_1$ is selected from the group consisting of hydrogen and alkyl; $R_2$ represents alkyl; R represents the radical necessary to form, together with the adjacent carbon atom, cycloalkyl; and X is selected from the group consisting of phenyl, halogenophenyl, alkylphenyl, alkenylphenyl, alkoxyphenyl, diphenylyl, benzylphenyl, benzyloxyphenyl, anilinophenyl, $\alpha$-naphthyl, halogeno-$\alpha$-naphthyl, alkyl-$\alpha$-naphthyl, alkenyl-$\alpha$-naphthyl, alkoxy-$\alpha$-naphthyl, phenyl-$\alpha$-naphthyl, benzyl-$\alpha$-naphthyl, benzyloxy-$\alpha$-naphthyl and anilino-$\alpha$-naphthyl, and the esters and salts thereof, together with at least one compound selected from the group consisting of androstane derivatives of the formulae:

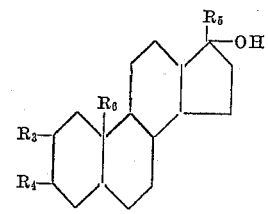

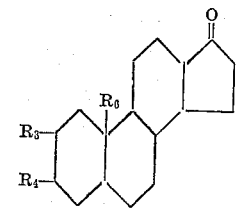

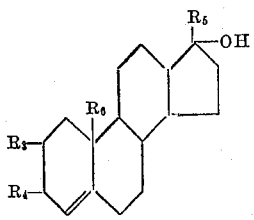

and

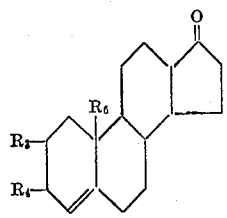

wherein $R_3$ is selected from the group consisting of hydrogen and hydroxymethylene; $R_4$ is selected from the group consisting of hydroxy and a doubly bound oxygen atom; and $R_5$ and $R_6$ are selected from the group consisting of hydrogen and methyl, and the lower fatty acid esters thereof.

2. A composition according to claim 1 in tablet form comprising a pharmaceutically effective mixture of calcium α-(4-chlorophenoxy)isobutyrate and androsterone, a non-toxic pharmaceutically acceptable carrier and a non-toxic pharmaceutically acceptable disintegrating agent.

3. A composition according to claim 1 in tablet form comprising a pharmaceutically acceptable mixture of α-(4-chlorophenoxy)isobutyric acid and androsterone, a non-toxic pharmaceutically acceptable carrier and a non-toxic pharmaceutically acceptable disintegrating agent.

4. A composition as claimed in claim 1 wherein the carboxylic acid ester is derived from an alcohol containing up to 4 carbon atoms.

5. A composition as claimed in claim 1 wherein the ratio of the proportion of the carboxylic acid derivative to the androstane derivative is from 5:1 to 100:1 respectively.

6. A composition as claimed in claim 1 wherein there is additionally present an oestrogen.

7. A composition as claimed in claim 1 wherein the ratio of the proportion of androstane derivative to the oestrogen is from 500:1 to 10:1 respectively provided that when the said compositions are administered the daily dose of oestrogen is within the range of 0.1 mg. to 5.0 mg.

8. A composition as claimed in claim 1 wherein there is present between 0.1 gm. and 1 gm. of the mixture of active ingredients contained in a capsule.

9. A composition as claimed in claim 1 wherein there is present between 0.1 gm. and 3 gm. of the mixture of active ingredients contained in a tablet.

10. A pharmaceutical composition comprising a pharmaceutically effective amount of a mixture of ethyl-α-(4-chlorophenoxy)isobutyrate and androsterone.

11. The composition of claim 10 in capsule form.

12. A composition according to claim 10 comprising about 100 parts by weight of ethyl-α-(4-chlorophenoxy)-isobutyrate and about 3 parts by weight of androsterone.

13. Process for the treatment of coronary artery disease and atherosclerosis which comprises administering an effective dose of a composition according to claim 1.

14. The process of claim 13 wherein a daily dosage of between 1 gm. and 10 gm. of the mixture is administered.

References Cited in the file of this patent
FOREIGN PATENTS 860,303    Great Britain _____ Feb. 1, 1961

OTHER REFERENCES

Myasnikov: Chem. Abst., vol. 49, p. 5646n, 1955.
Cavallini: J. Am. Chem. Assoc., vol. 79, pp. 3514–3517, 1957.
British Medical Journal, Mar. 1, 1958. p. 509.